United States Patent [19]
Handley

[11] Patent Number: 6,023,534
[45] Date of Patent: *Feb. 8, 2000

[54] METHOD OF EXTRACTING IMAGE DATA FROM AN AREA GENERATED WITH A HALFTONE PATTERN

[75] Inventor: John C. Handley, Fairport, N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/905,610

[22] Filed: Aug. 4, 1997

[51] Int. Cl.$^7$ ...................................................... G06K 9/40
[52] U.S. Cl. .......................... 382/275; 382/257; 382/260; 382/266; 358/429; 358/456
[58] Field of Search ..................................... 382/199, 176, 382/200, 209, 217, 219, 257, 260, 266, 267, 268, 274, 275, 282, 283, 290, 291, 292, 301; 358/429, 453, 452, 456, 462, 538

[56] References Cited

U.S. PATENT DOCUMENTS

| | | | |
|---|---|---|---|
| 3,582,884 | 6/1971 | Shepard | 340/146.3 |
| 4,034,343 | 7/1977 | Wilmer | 340/146.3 |
| 4,400,738 | 8/1983 | Tomory et al. | 358/283 |
| 5,131,049 | 7/1992 | Bloomberg et al. | 382/257 |
| 5,140,650 | 8/1992 | Casey et al. | 382/61 |
| 5,317,646 | 5/1994 | Sang, Jr. et al. | 382/282 |
| 5,392,365 | 2/1995 | Steinkirchner | 382/260 |
| 5,448,651 | 9/1995 | Sakou et al. | 382/176 |
| 5,542,007 | 7/1996 | Chevion et al. | 382/232 |
| 5,617,485 | 4/1997 | Ohuchi et al. | 382/176 |
| 5,625,721 | 4/1997 | Lopresti et al. | 382/176 |
| 5,647,021 | 7/1997 | Baird et al. | 382/176 |
| 5,680,479 | 10/1997 | Wang et al. | 382/176 |
| 5,696,841 | 12/1997 | Nakatsuka | 382/176 |
| 5,696,842 | 12/1997 | Shirasawa et al. | 382/176 |
| 5,815,595 | 9/1998 | Gugler | 382/282 |
| 5,825,937 | 10/1998 | Ohuchi et al. | 382/261 |

FOREIGN PATENT DOCUMENTS 2 737 930  2/1997  France .

OTHER PUBLICATIONS

A. Hamburgen, "Filterable Preprinted Guidlelines for Optical Character Recognition", IBM Technical Disclosure Bulletin, vol. 15, No. 10, Mar., 1973, pp. 3115–3316.

J.S. Payne, T.J. Stonham and D. Patel, "Document Segmentation Using Texture Analysis", Proceedings of the IAPR International Conference on Pattern Recognition, Jerusalem, Oct. 9–13, 1994 Conference B: Pattern Recognition and Neural Networks, vol. 2, No. Conf. 12, Oct. 9, 1994, pp. 380–382, XP000509910 Institute Of Electrical and Electronics Engineers ISBN: 0–8186–6272–7.

Breuel, T. M. entitled "Recognition of handwritten responses on U.S. census forms," *Document Analysis Systems*, A. Lawrence Spitz, Andreas Dengle, Editors, World Scientific Publishing, 237–264 (1994).

(List continued on next page.)

*Primary Examiner*—Matthew C. Bella
*Attorney, Agent, or Firm*—L. M. Ortiz; G. B. Cohen; Philip E. Blair

[57] ABSTRACT

A method for generating forms using halftones along with a set of low-complexity image processing steps to extract the characters for recognition. The method exploits texture differences between character strokes and halftoned boxes or text fields. Form frames are rendered as black and white halftones and characters are extracted by exploiting differences in texture between the frames and the character strokes. A sequence of simple image processing operations, easily done in hardware, eliminates the frames while leaving the characters intact. Halftones, giving the appearance of a light color as in the dropout-color method, are easily produced by page description languages; thus, blank and filled-in forms can be scanned, printed, stored and photocopied at low cost.

1 Claim, 4 Drawing Sheets

OTHER PUBLICATIONS

Ramanaprasad, V., Shin, Y-C., and Srihari, S. N., in "Reading hand-printed addresses on IRS tax forms," in *Document Recognition III*, Luc M. Vincent, Jonathan J. Hull, Editors, Proc. SPIE 2660, 243-250 (1996).

M. D. Garris and D. L. Dimmick, "Form design for high accuracy optical character recognition," *IEEE Transactions on Pattern Analysis and Machine Intelligence*, vol. 18, No. 6, Jun. 1996, pp. 653-656.

M. D. Garris, "Intelligent form removal with character stroke preservation," *Proc. SPIE* vol. 2660, 1996, pp. 321-332.

B. Yu and A. K. Jain, "A generic system for form dropout," *IEEE Transactions on Pattern Recognition*, vol. 18, No. 11, Nov. 1996, pp. 1127-1134.

R. Casey, D. Ferguson, K. Mohiuddin, and E. Walach, "Intelligent forms processing system," *Machine Vision and Applications*, vol. 5, 1992, pp. 143-155.

S. Liebowitz Taylor, R. Fritzon, and J. A. Pastor, "Extraction of data from preprinted forms," *Machine Vision and Applications*, vol. 5, 1992, pp. 211-222.

S. Mori, C. Y. Suen, and K. Yamamoto, "Historical review of OCR research and development," Proceedings of the IEEE, vol. 80, No. 7, 1992, pp. 1029-1058.

PLEASE RUSH MY PRIZE

FIG. 1

PLEASE RUSH MY PRIZE

FIG. 2

PLEASE RUSH MY PRIZE

FIG. 3

METHOD OF EXTRACTING IMAGE DATA FROM AN AREA GENERATED WITH A HALFTONE PATTERN

FIELD OF THE INVENTION

This invention is generally related to character recognition using forms and, more particularly, to a method of rendering forms for improved data recognition and processing steps for extracting target characters for recognition.

BACKGROUND OF THE INVENTION

Forms processing represents a major commercial activity whereby data filled in by hand or typed is automatically extracted from electronically scanned documents. The costly nature of data entry by hand has spurred the development of automatic systems to extract the data. A convenient way to enter data electronically is to allow users to enter written responses on a form and then optically recognizing the data using the OCR techniques. Examples include the Census and IRS tax forms. Typically, the data is keyed in by an operator but there is a growing effort to reduce costs and increase speed by scanning form documents and recognizing the hand-written text. For an example of such processes, refer to an article by Breuel T. M. entitled "Recognition of handwritten responses on U.S. census forms," *Document Analysis Systems*, A. Lawrence Spitz, Andreas Dengle, Editors, World Scientific Publishing, 237–264 (1994). To increase recognition accuracy, forms are often constructed as an arrangement of boxes in which the user enters characters. The boxes force the writer to clearly separate characters, obviating the need for character segmentation. False segmentation is a major contributor to recognition errors. Extraction of the hand-printed data is difficult unless one uses a drop-out color, perhaps blue. This requires the forms to be printed in multiple colors. Another approach is to use black boxes, which has the advantage of being easily and cheaply produced, but one must perform sophisticated image processing steps to remove the box as shown by Ramanaprasad, V., Shin, Y-C., and Srihari, S. N., in "Reading hand-printed addresses on IRS tax forms," in *Document Recognition III*, Luc M. Vincent, Jonathan J. Hull, Editors, Proc. SPIE 2660, 243–250 (1996). This may include registering the original blank form with the scanned image and subtracting the form image leaving only the characters. Unfortunately, if a character stroke overlaps the box, that character stroke would also be removed. This can severely reduce character recognition accuracy. Central to cost reduction is highly accurate optical character recognition of the data entries because the more errors there are, the more human effort must be expended to find and correct them.

One major source of errors is merged characters. This causes ambiguity in interpretation. Forms are designed to force the writer to separate each character, isolated characters being recognized more accurately as described by M. D. Garris and D. L. Dimmick, "Form design for high accuracy optical character recognition," *IEEE Transactions on Pattern Analysis and Machine Intelligence*, Vol 18, No. 6, June 1996, pp. 653–656. Thus forms consist of any number of frames, i.e., designated areas for data entry. Another source of errors is the overlap of entries with the frames used to guide the writer because the frame obscures parts of the characters as shown by M. D. Garris. There are two solutions to this problem in the prior art: 1) print the form in a dropout color different from the color used to draw the form so that the form and the filled in data can be distinguished optically, and 2) remove the frames algorithmically from a scanned form image and algorithmically repair the damage made to the filled-in characters. See M. D. Garris, "Intelligent form removal with character stroke preservation," Proc. SPIE Vol 2660, 1996, pp. 321–332, and B. Yu and A. K. Jain, "A generic system for form dropout," *IEEE Transactions on Pattern Recognition*, Vol 18, No. 11, November 1996, pp. 1127–1134, which both describe this phenomena.

The first solution has a number of disadvantages. First, one must produce a form in two colors, one color for the instructions or printed text and a lighter color for the frames. This increases the cost of form production by requiring printing on a two-color printer. Secondly, the forms must be scanned using a scanner with either a bulb the color of the dropout or the scanner must be color and the resulting image processed to remove the color. In either case, form processing costs are increased. Finally, two-color forms cannot be photocopied on black and white copiers.

The second solution requires that the form be removed algorithmically. For example, a blank form can be rendered in computer memory and registered with the scanned filled-in image and subtracted from the image leaving only the entered data. The following references provide more background for such processes: R. Casey, D. Ferguson, K. Mohiuddin, and E. Walach, "Intelligent forms processing system," *Machine Vision and Applications*, Vol 5, 1992, pp. 143–155; S. Liebowitz Taylor, R. Fritzon, and J. A. Pastor, "Extraction of data from preprinted forms," *Machine Vision and Applications*, Vol 5, 1992, pp. 211–222; U.S. Pat. No. 5,140,650, "Computer-implemented method for automatic extraction of data from printed forms."; and U.S. Pat. No. 5,542,007, issued to Chevion et a. on Jul. 30, 1996, entitled "Form dropout compression method which handles form white-out and writing in shaded and white-out areas of the form". This requires either a blank version of the form to be scanned in or a model of the form in computer memory. One can also remove the form by carefully erasing long horizontal and vertical lines (see Garris and Yu). In either case, character entries are damaged by the line removal. Strokes must be repaired using carefully crafted rules. In the case where a stroke coincides with a frame line, this is impossible. Traditionally, if no drop-out color is used, one must remove the form boxes from a scanned image somehow. This can also be done by subtracting (XOR) the original form image from a scanned image. However, one may lose parts of the character images this way. Sophisticated image processing methods are still required to preserve the character images and these methods perform poorly.

As for optical character recognition (OCR), OCR is the process of converting photonic or electronic representations of a character form into a symbolic form. In modern systems, the data are kept in computer memory, whether on a hard disk or in random access memory. The symbolic representation can then be stored and edited. The process consists of three steps: scanning, feature extraction and classification. The first step takes place by using a light-sensitive device to convert a character printed on a substrate into electronic impulses and represented as an array in a processor memory. The character might also be printed in a magnetic ink and sensed using a suitable device. Step two consists of extracting features from the character image represented as an array. Choosing a good feature set to distinguish among a set of characters, whether they are printed by machine (as in typewriting or typesetting) or by the human hand, is and has been an active area of research and development as shown in work by S. Mori, C. Y. Suen, and K. Yamamoto, "Historical review of OCR research and development," Proceedings of the IEEE, vol. 80, no. 7, 1992, pp. 1029–1058. Step three applies a decision rule to the observed extracted feature and assigns it a class, i.e., a character code. In the case of hidden-layer neural network methods for OCR, step two occurs in the first layer and step three in the second layer. For more information on OCR see U.S. Pat. No. 4,034,343, issued to Michael E. Wilmer on Jul. 5, 1977, entitled "Optical character recognition system", describes prior art in OCR in the spatial domain. U.S. Pat. No. 3,582,884, dated Jun. 1, 1971, entitled "Multiple-scanner character reading system", describes a OCR system on a communications network in which characters are scanned and represented as signals. Decoding from the signals to the original video scan data is done before recognition.

In order to overcome the shortcoming of the prior art regarding form rendering and character recognition it is an objective of this invention to generate forms simply and easily using halftones on inexpensive printers along with a set of low-complexity image processing steps to extract the characters for recognition.

All of the references cited herein are incorporated by reference for their teachings.

SUMMARY OF THE INVENTION

The invention exploits texture differences between character strokes and halftoned boxes, while other methods use differences in optical density (e.g., drop out color) or structural differences (subtracting out boxes and recovering strokes). This method generates form boxes using a halftone, say the ubiquitous halftone scheme used in Adobe Corporation's PostScript™. Basically, a form having halftoned boxes is filled in with handwritting or typed characters by a user. The form is then scanned on a gray-scale scanner in a manner that distinguishes between the halftoned boxes and user's characters. Even when handwritten or subsequently typed characters overlap boxes of the form, the characters are recognizable because the halftoned boxes of the form are subtracted from the image during scanning. The typological properties of all handwritten or typed characters would not be adversely affected by the halftoned boxes, even in overlap situations, because of the box subtraction.

The method of form rendering described herein overcomes all of the identified deficiencies. Form frames, selected text, symbols or characters are rendered as black and white halftones and subsequently written or typed characters are extracted by exploiting differences in texture between the frames and the new character strokes. A sequence of simple image processing operations, which can easily be done in hardware or software, eliminates the frames (or other selected fields) while leaving the subsequently added characters intact. Halftones, giving the appearance of a light color as in the dropout-color method, are easily produced by page description languages such as Postscript thus blank forms can be printed and photocopied at low cost With implementation of the disclosed invention, customized forms can be generated using whatever printer is handy, not necessarily a color printer, capable of producing halftones. Reliable recognition requires minimal image processing resources given this invention. The present method is low in computational complexity and memory required to extract characters from these halftoned forms. Thus, low cost, custom forms are produced that promote a reliable, inexpensive way to extract target characters. Hand-written form data can be converted in electronic form by scanning the form and recognizing hand printed characters automatically.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 1 illustrates a sample of an original form having halftoned boxes and containing handwritten text.

FIG. 2 illustrates a sample of resulting recognition for the image of FIG. 1.

FIG. 3 illustrates sharpening of the image of FIG. 1.

DETAILED DESCRIPTION OF THE INVENTION

The method disclosed herein generates form boxes using halftones, say the ubiquitous halftone scheme used in PostScript, and provides for the recognition of subsequently written or typed characters by subtracting the halftoned form boxes. Although the following discussion refers to form boxes and handwritten characters, it must be understood that this method can be used to eliminate any selected field, symbol or text in a form, and can recognize characters, typed or handwritten, subsequently entered on a form by a user.

Referring to FIG. 1, a field of a form with boxes generated using halftone techniques is shown. For this sample the form was generated as a PostScript file, printed on a 300 dpi SparcPrinter, filled in with handwriting by a user, and scanned on a gray-scale scanner at 200 spots per inch (spi) and 8 bits per pixel. Note that the written characters overlap the boxes. Were the boxes simply subtracted from the image, the topological properties of the characters would be adversely affected, especially the 'E' in "PRIZE." After simple image processing, the result is a binary image which retains the character images as shown in FIG. 2.

The first step is to sharpen the original image in FIG. 1 using a convolution with mask:

$$\begin{matrix} -1 & -1 & -1 \\ -1 & 10 & -1 \\ -1 & -1 & -1 \end{matrix}$$

which produces the image illustrated in FIG. 3.

Figure 4:
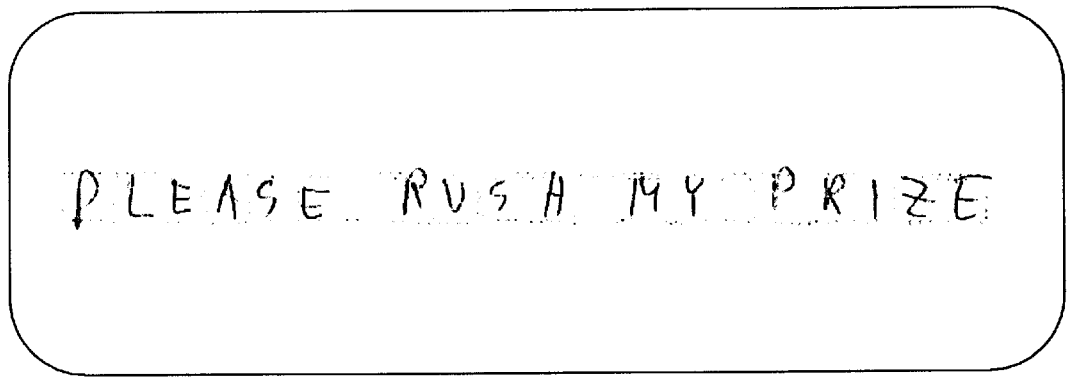
FIG. 4 illustrates FIG. 3 after morphological closing.

In the next stage, a morphological closing on the image using a 2×2 structuring element as explained in *An Introduction to Nonlinear Image Processing*, E. R. Dougherty and J. T. Astola, SPIE Press, 1994. Referring to FIG. 4, since the halftoned boxes contain alternating high (white) and low (dark) pixels, the structuring element fails to fit in the low isolated pixels, but does fit in the thicker character strokes.

Figure 5:
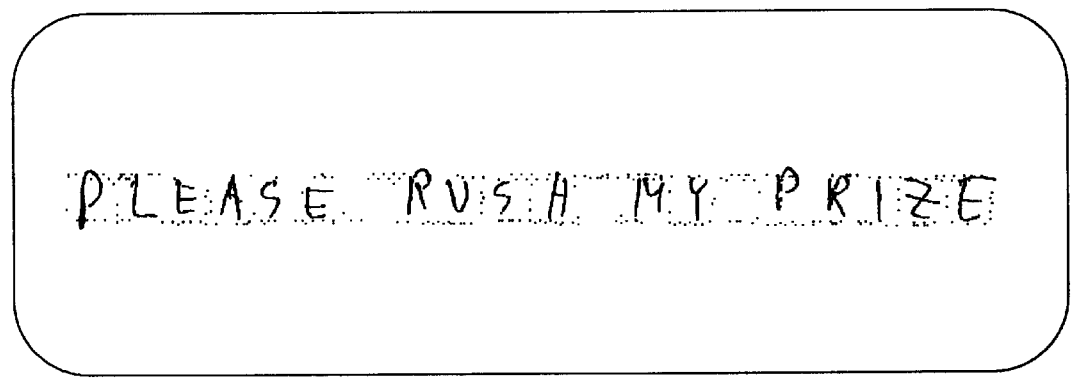
FIG. 5 illustrates FIG. 4 after thresholding.

The closed image is thresholded to get a binary image for subsequent character recognition as shown in FIG. 5.

Figure 6:
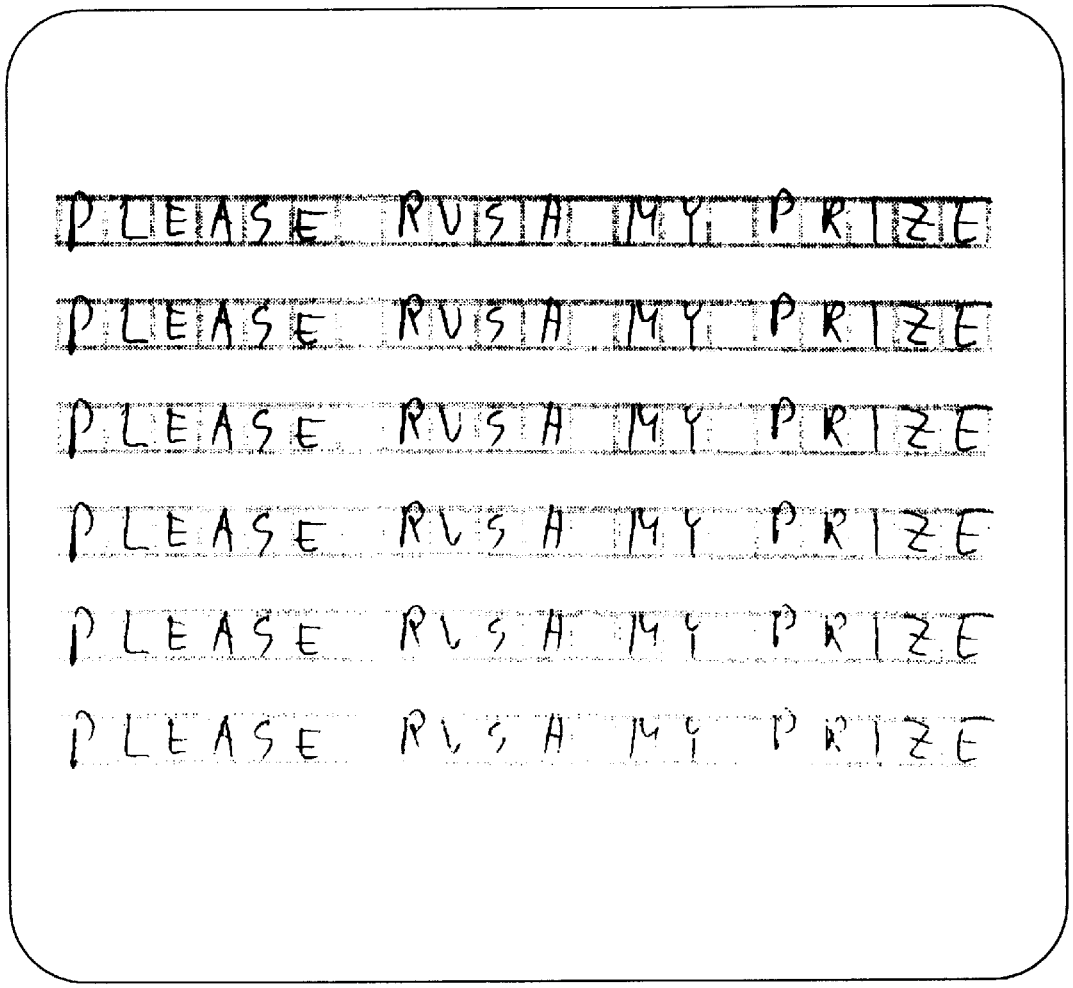
FIG. 6 illustrates a series of samples for image 1 when thresholded at 200, 190, 180, 170, 160 and 150, respectively.

The final step is to "dry-clean" the image of spurious small connected components or blobs in the image and the result is shown in FIG. 2. A simple thresholding method would not work as well. FIG. 6 illustrates a sequence of images thresholded at 200, 190, 180, 170, 160 and 150. As the threshold is lowered so that more pixels become white, the boxes drop out, but so do the thin strokes on the characters. Once lost, they cannot be recovered or easily inferred.

Figure 7:
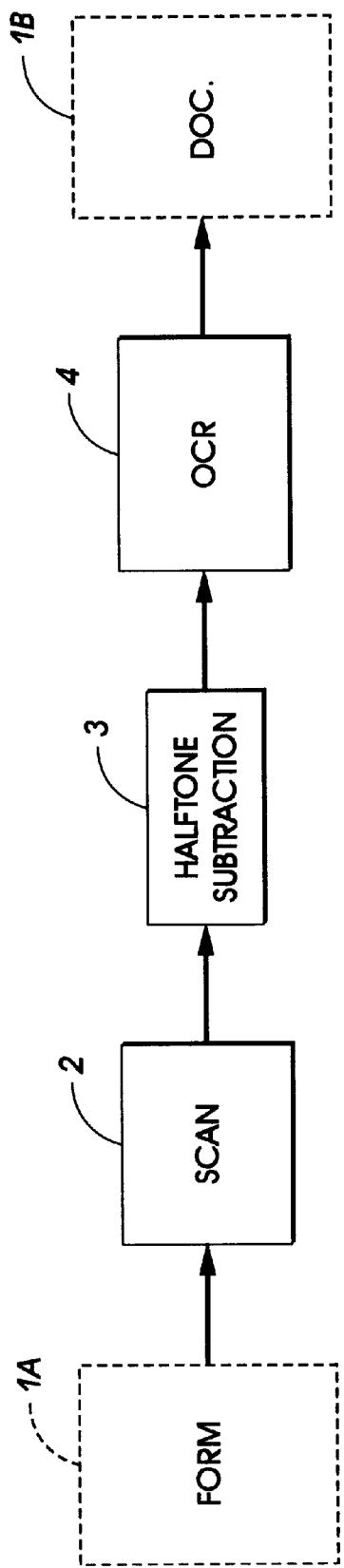
FIG. 7 is a block diagram of modules necessary to achieve character recognition utilizing the disclosed invention.

Referring to FIG. 7, a form la containing halftoned fields and subsequently entered handwritten text (as shown in FIGS. 1–2) is electronically scanned 2. Halftoned subtraction 3 is then performed on the scanned image to eliminate the halftoned fields. Subtraction can occur during the scanning sequence within the scanning hardware, or by software manipulation using a microprocessor. Once subtraction 3 is completed, the document generated by the scanning/subtraction process can undergo additional OCR processing 4. Handwritten characters will be recognized and classified during OCR 4. The resulting document 1b will only contain recognized characters resembling data entered onto the original form by a user. The recognized characters can undergo further manipulation or storage at this point While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A method for enhancing extraction of image data subsequently applied to distinct frame boxes of halftone patterns of alternating high (white) and low (dark) pixellated regions, comprising the steps of:

sharpening said image data using a convolution with at least one mask;

morphologically closing on said image data with at least one structured element;

thresholding said morphologically closed image into a binary image;

repeatedly lowering said threshold so that, as more of said pixellated regions become white, boxes of said frame are erased along with one or more spurious connected components of said image; and electronically scanning said image to eliminate remaining halftone regions.

* * * * *